(12) United States Patent
Cadima

(10) Patent No.: US 11,998,140 B2
(45) Date of Patent: Jun. 4, 2024

(54) COOKTOP APPLIANCE WITH HERMETICALLY SEALED TEMPERATURE SENSOR

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 906 days.

(21) Appl. No.: 16/925,706

(22) Filed: Jul. 10, 2020

(65) Prior Publication Data

US 2022/0007889 A1    Jan. 13, 2022

(51) Int. Cl.
*A47J 37/06* (2006.01)
*G01K 1/14* (2021.01)

(52) U.S. Cl.
CPC ............ *A47J 37/0682* (2013.01); *G01K 1/14* (2013.01); *G01K 2207/00* (2013.01)

(58) Field of Classification Search
None
See application file for complete search history.

(56) References Cited

U.S. PATENT DOCUMENTS

| | | |
|---|---|---|
| 3,100,995 A | 8/1963 | Woodward |
| 4,812,624 A * | 3/1989 | Kern ..................... H05B 3/70 219/450 |
| 6,138,554 A | 10/2000 | Cole |
| 2013/0285777 A1* | 10/2013 | Piascik et al. ............ H01F 5/00 335/299 |
| 2017/0102606 A1* | 4/2017 | Pavis et al. ............ G03B 17/56 |

FOREIGN PATENT DOCUMENTS

| | | | | |
|---|---|---|---|---|
| CA | 3064233 A1 | * | 12/2019 | .............. F24C 15/10 |
| JP | 2009277550 A | * | 11/2009 | .............. H01R 9/16 |
| JP | 2010117206 A | * | 5/2010 | .............. G01K 1/14 |
| JP | 2011075261 A | | 4/2011 | |
| KR | 101802776 B1 | | 12/2017 | |

OTHER PUBLICATIONS

Machine translation of JP 2010117206 A performed on Nov. 14, 2023, Uematsu et al. (Year: 2010).*
Machine translation of JP 2009277550 A performed on Nov. 14, 2023, Moriya et al. (Year: 2009).*

* cited by examiner

*Primary Examiner* — Dana Ross
*Assistant Examiner* — Kevin Guanhua Wen
(74) *Attorney, Agent, or Firm* — Dority & Manning, P.A.

(57) ABSTRACT

A cooktop appliance includes a panel with a burner disposed on the panel. A griddle plate is configured to be removably positioned over the burner. A hermetically sealed temperature sensor is embedded in the griddle plate. The temperature sensor includes a base, a probe extending from the base, a contact pad in the base, and a hermetic seal formed in the base.

15 Claims, 17 Drawing Sheets

COOKTOP APPLIANCE WITH HERMETICALLY SEALED TEMPERATURE SENSOR

FIELD OF THE INVENTION

The present subjection matter relates generally to cooktop appliances, such as cooktop appliances with a griddle assembly and temperature sensors therein.

BACKGROUND OF THE INVENTION

Cooking appliances, e.g., cooktops or ranges (also known as hobs or stoves), generally include one or more heated portions for heating or cooking food items within or on a cooking utensil placed on the heated portion. For instance, burners may be included with each heated portion. The heated portions utilize one or more heating sources to output heat, which is transferred to the cooking utensil and thereby to any food item or items that are disposed on or within the cooking utensil. For instance, a griddle may be provided to extend across one or more heated portions. When disposed above the heated portion, the griddle generally provides a substantially flat cooking surface.

Although a griddle may provide a flat cooking surface, difficulties may arise in dispersing or spreading heat across the flat cooking surface. Generally, heat from the burners of the appliance is directly transferred to the griddle according to the footprint of the burner. In turn, heat may be uneven across various portions of the flat cooktop surface. This may result in one portion of the flat cooking surface being heated to a significantly higher temperature than the rest of the flat cooking surface (i.e., creating "hot spots"). If the griddle extends over multiple burners, such hot spots may be increasingly problematic and cause food items thereon to be cooked unevenly. It can be difficult to balance the heat output of multiple burners. Moreover, since the relative heat output of the multiple burners may vary, a user may accidentally overheat the griddle and/or food thereon.

One or more temperature sensors may be used to measure or track the temperature of the griddle during cooking operation, such as to identify hot spots and/or adjust the output of the one or more burners in the heated portion over which the griddle is disposed in response to the temperature. Such temperature sensors, however, generally include sensitive electronics which may not be robust for a cooking environment, e.g., due to spills or dripping from the cooking surface which may contaminate the sensor. Additionally, such temperature sensors may not be robust for cleaning, e.g., the temperature sensor may not be suitable for submersion during washing or washing in a dishwasher appliance.

Accordingly, a gas cooktop appliance with features for measuring or monitoring the heating of a removable griddle would be useful. In particular, a gas cooktop appliance with robust, durable features for measuring a temperature of a griddle would be useful.

BRIEF DESCRIPTION OF THE INVENTION

Aspects and advantages of the invention will be set forth in part in the following description, or may be obvious from the description, or may be learned through practice of the invention.

In one aspect of the present disclosure, a cooktop appliance is provided. The cooktop appliance includes a panel having a top surface and a bottom surface. A burner is disposed on the panel. The cooktop appliance also includes a terminal block positioned on the panel adjacent to the burner. The cooktop appliance further includes a frame removably mounted to the top surface of the panel. A griddle plate is configured to be supported on the frame over the burner when the frame is removably mounted to the top surface of the panel. The cooktop appliance also includes a hermetically sealed temperature sensor embedded in the griddle plate. The temperature sensor includes a base, a probe extending from the base, a contact pad in the base, and a hermetic seal formed in the base. The contact pad is configured to form an electrical connection with the terminal block.

In another aspect of the present disclosure, a cooktop appliance is provided. The cooktop appliance includes a panel with a burner disposed on the panel. A griddle plate is configured to be removably positioned over the burner. A hermetically sealed temperature sensor is embedded in the griddle plate. The temperature sensor includes a base, a probe extending from the base, a contact pad in the base, and a hermetic seal formed in the base.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
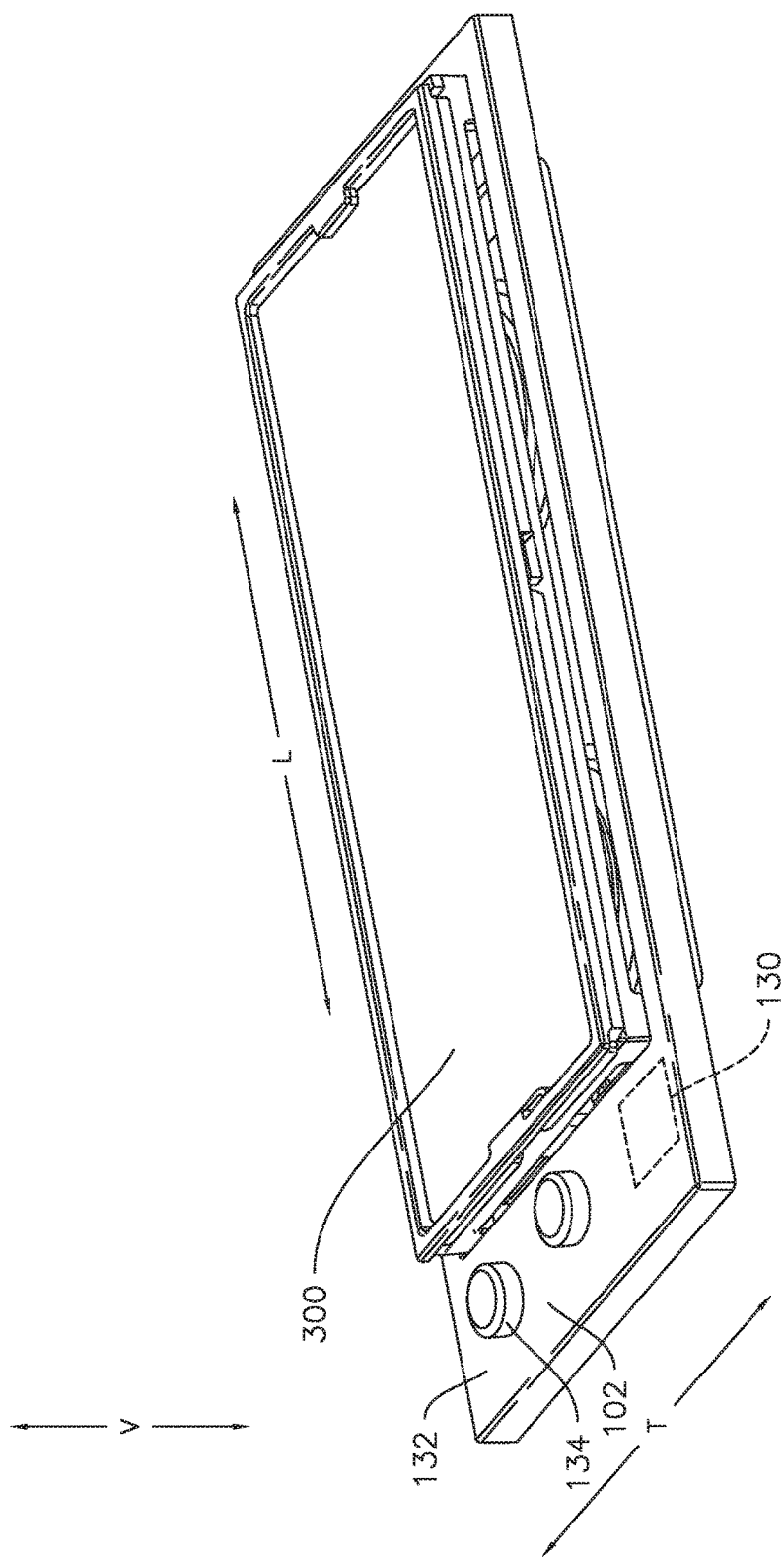
FIG. 1 provides a perspective view of a cooktop appliance according to one or more example embodiments of the present disclosure.
Figure 2:
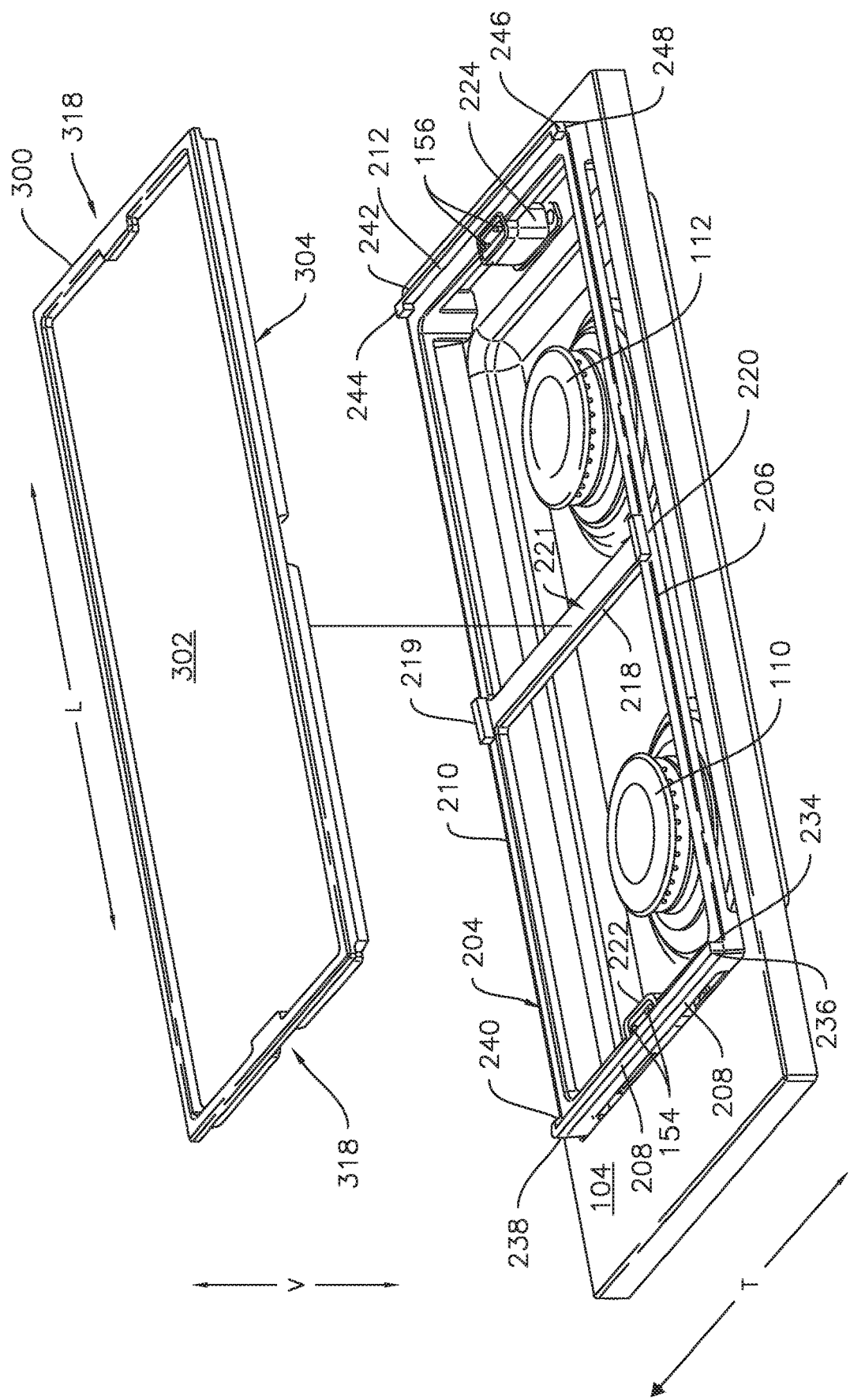
FIG. 2 provides a partially exploded view of the example cooktop appliance of FIG. 1.
Figure 3:
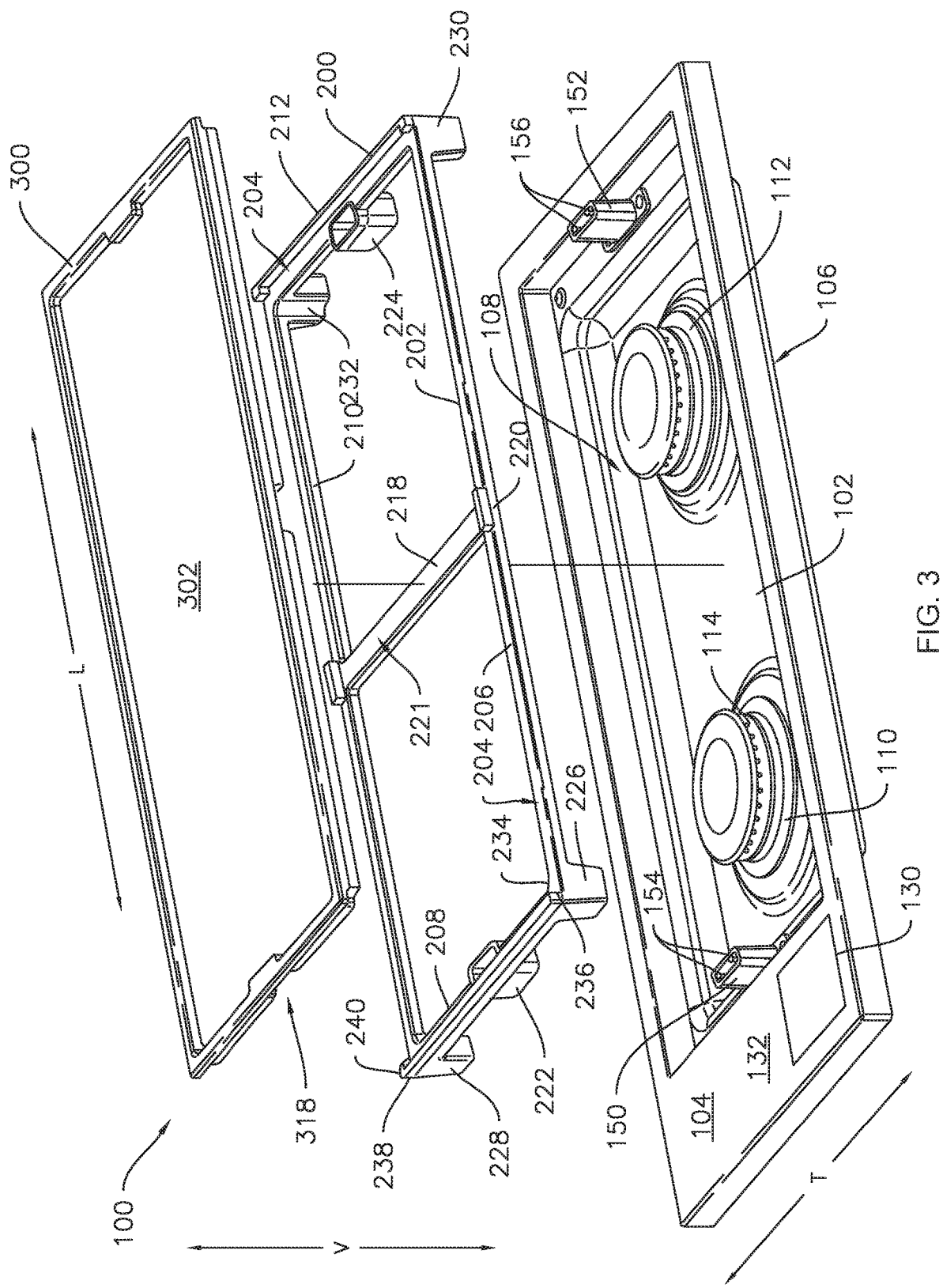
FIG. 3 provides an exploded view of the example cooktop appliance of FIG. 1.
Figure 4:
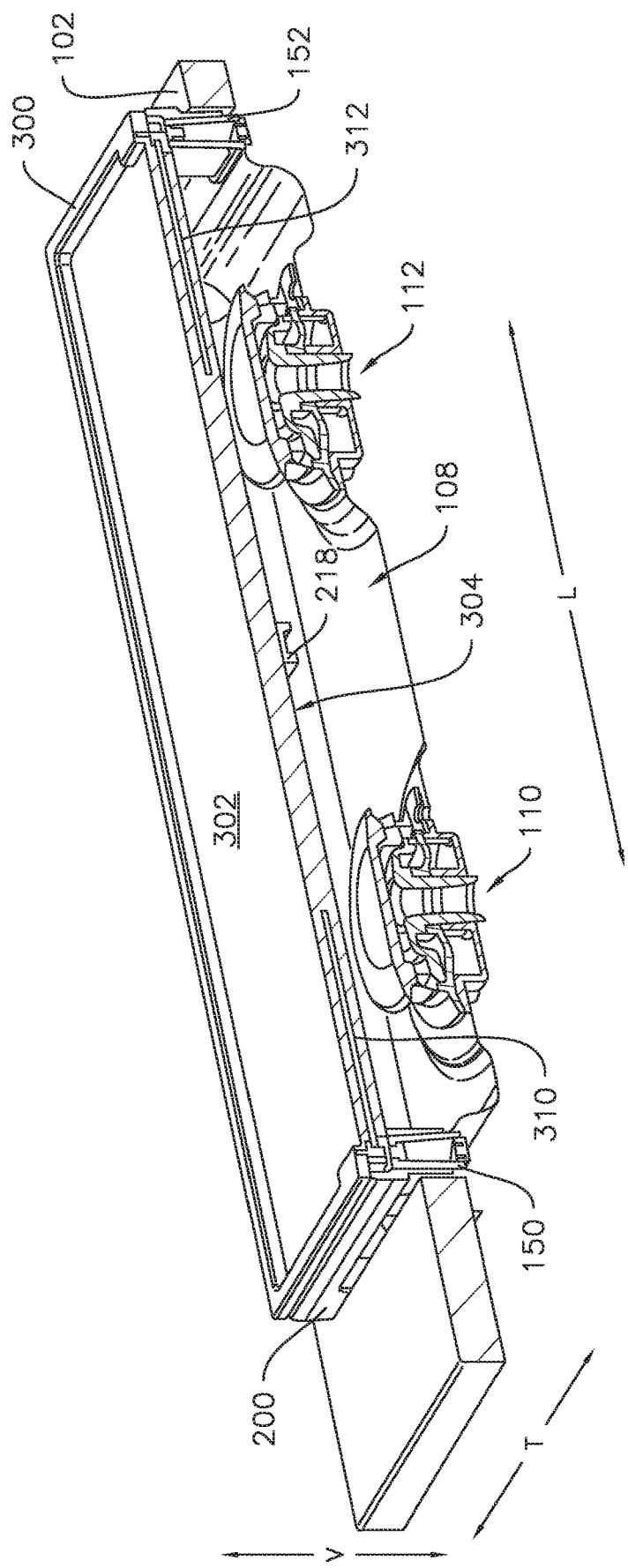
FIG. 4 provides a longitudinal section view of the example cooktop appliance of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

FIGS. 1 through 13 illustrate one or more example embodiments of a cooktop appliance 100 according to the present disclosure. The example cooktop appliance 100 includes a panel 102 that extends in a lateral direction L and a transverse direction T, e.g., perpendicular to a vertical direction V. Each of the vertical direction V, lateral direction L, and transverse direction T is mutually perpendicular to every other of the vertical direction V, the lateral direction L, and the transverse direction T, such that an orthogonal direction system is formed. The panel 102 may include a top surface 104 and a bottom surface 106. By way of example, the panel 102 may be constructed of enameled steel, stainless steel, glass, ceramics, and combinations thereof.

In some embodiments, as may be seen, e.g., in FIGS. 2-4 and 6, the cooktop appliance 100 may include a plurality of burners. In other embodiments, the cooktop appliance 100 may include a single burner which may be, e.g., the only burner on the cooktop appliance 100 or the only burner which corresponds to (e.g., is overlain by and directly heats) a griddle plate. For example, the cooktop appliance 100 may include a first burner 110 disposed on the panel 102 and a second burner 112 spaced apart from the first burner 110 on the panel 102. For example, as illustrated, the first burner 110 and the second burner 112 may be aligned along the transverse direction T and spaced apart along the lateral direction L. The panel 102 may also include a recessed portion 108, e.g., which extends downward along the vertical direction V. The first and second burners 110 and 112 may be positioned within the recessed portion 108. The recessed portion 108 may collect spilled material, e.g., foodstuffs, during operation of the cooktop appliance.

The cooktop appliance 100 may also include a user interface panel 132 located within convenient reach of a user of the cooktop appliance 100. In various embodiments, the user interface panel may include user inputs 134, such as knobs, buttons, or a touchscreen, etc., which are generally understood by those of ordinary skill in the art and are therefore not shown or described in extensive detail herein for the sake of brevity and clarity. The user inputs 134 may allow the user to activate one or more burners and determine an amount of heat provided by each gas burner. The user interface panel 132 may also be provided with one or more graphical display devices that deliver certain information to the user, e.g., whether a particular burner is activated and/or the level at which the burner is set.

Operation of the cooktop appliance 100 can be regulated by a controller 130 that is operably coupled to (i.e., in operative communication with) the user inputs and/or gas burners. For example, in response to user manipulation of the user input(s), the controller 130 operates one or more of the burners 110, 112. By way of example, the controller 130 may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In some embodiments, the processor may execute non-transitory programming instructions stored in memory. For example, the instructions may include a software package configured to operate appliance 100 and execute an operation routine such as one or more methods of operating the cooktop appliance. The memory may be a separate component from the processor or may be included onboard within the processor.

The controller 130 may be disposed in a variety of locations throughout appliance 100. Input/output ("I/O") signals may be routed between the controller 130 and various operational components of appliance 100, such as the gas burners 110, 112, inputs, a graphical display, one or more sensors, and/or one or more alarms.

Figure 5:
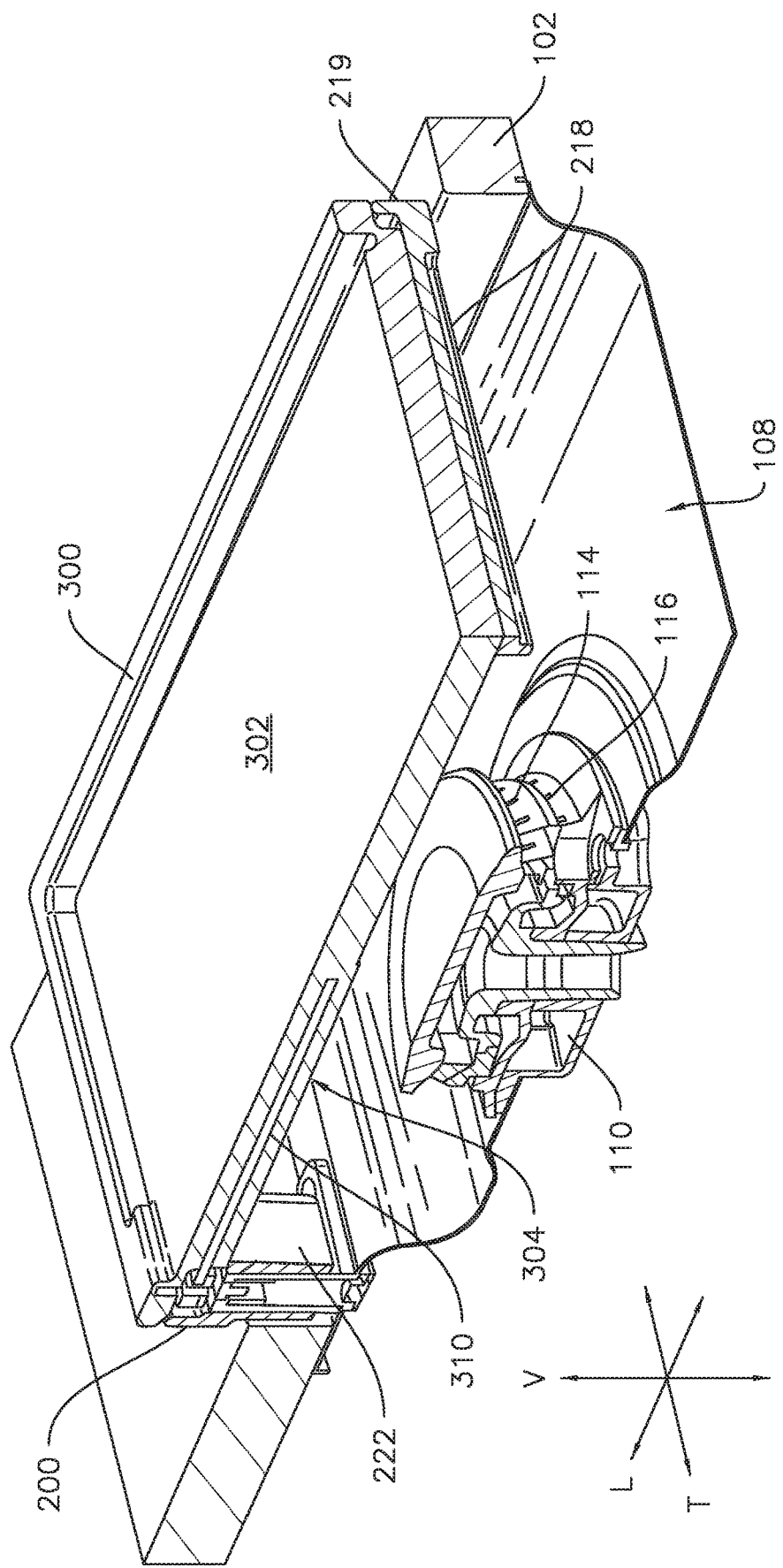
FIG. 5 provides a sectional view of a portion of the cooktop appliance of FIG. 1.

In the illustrated example embodiments, each gas burner 110, 112 includes a generally circular shape from which a flame may be emitted. As shown, each gas burner 110, 112 includes a plurality of fuel ports 114 is defined circumferentially in fluid communication with an internal passage of each respective burner 110, 112. In some embodiments, e.g., as illustrated in FIG. 5, one or both of the first burner 110 and the second burner 112 may be a multi-ring burner. For example, as illustrated in FIG. 5, the first burner 110 may include a first plurality of fuel ports 114 defining a first ring of the burner 110 and a second plurality of fuel ports 116 defining a second ring of the burner 110. In such embodiments, a first fuel chamber in fluid communication with the first plurality of fuel ports 114 may be separated from a second fuel chamber in fluid communication with the second plurality of fuel ports 116 by a wall within the burner 110, and the burner may be configured to selectively supply fuel to one or both of the fuel chambers. In some embodiments of a cooktop appliance, multiple burners of differing types may be provided in combination, e.g., one or more single-ring burners as well as one or more multi-ring burners. In additional embodiments, a single burner may be provided, such as a single elongated or oblong/oval burner which more closely matches the lateral and transverse proportions of the griddle plate. Moreover, other suitable burner configurations are also possible.

In some embodiments, the cooktop appliance may be configured for closed-loop cooking. For example, the controller 130 may be operable to receive a set temperature (such as from a user input of the cooktop appliance 100 or wirelessly from a remote device such as a smartphone) and to compare the set temperature to temperature measurements from one or more temperature sensors, such as a temperature sensor associated with each burner, and to automatically adjust each burner, such as a fuel flow rate to each burner, based on the comparison of the corresponding temperature measurement to the set temperature.

Thus, the controller 130 may be in operative communication with one or more temperature sensors. For example, the controller 130 may be selectively in operative communication with one or more embedded temperature sensors 310, 312 in a griddle plate 300 via pogo pin terminal blocks positioned on, e.g., mounted to, the panel 102. In some embodiments, the cooktop appliance 100 may therefore include at least one terminal block for connecting to the embedded temperature sensor(s) 310 and/or 312, such as a first pogo pin terminal block 150 and a second pogo pin terminal block 152.

Figure 6:
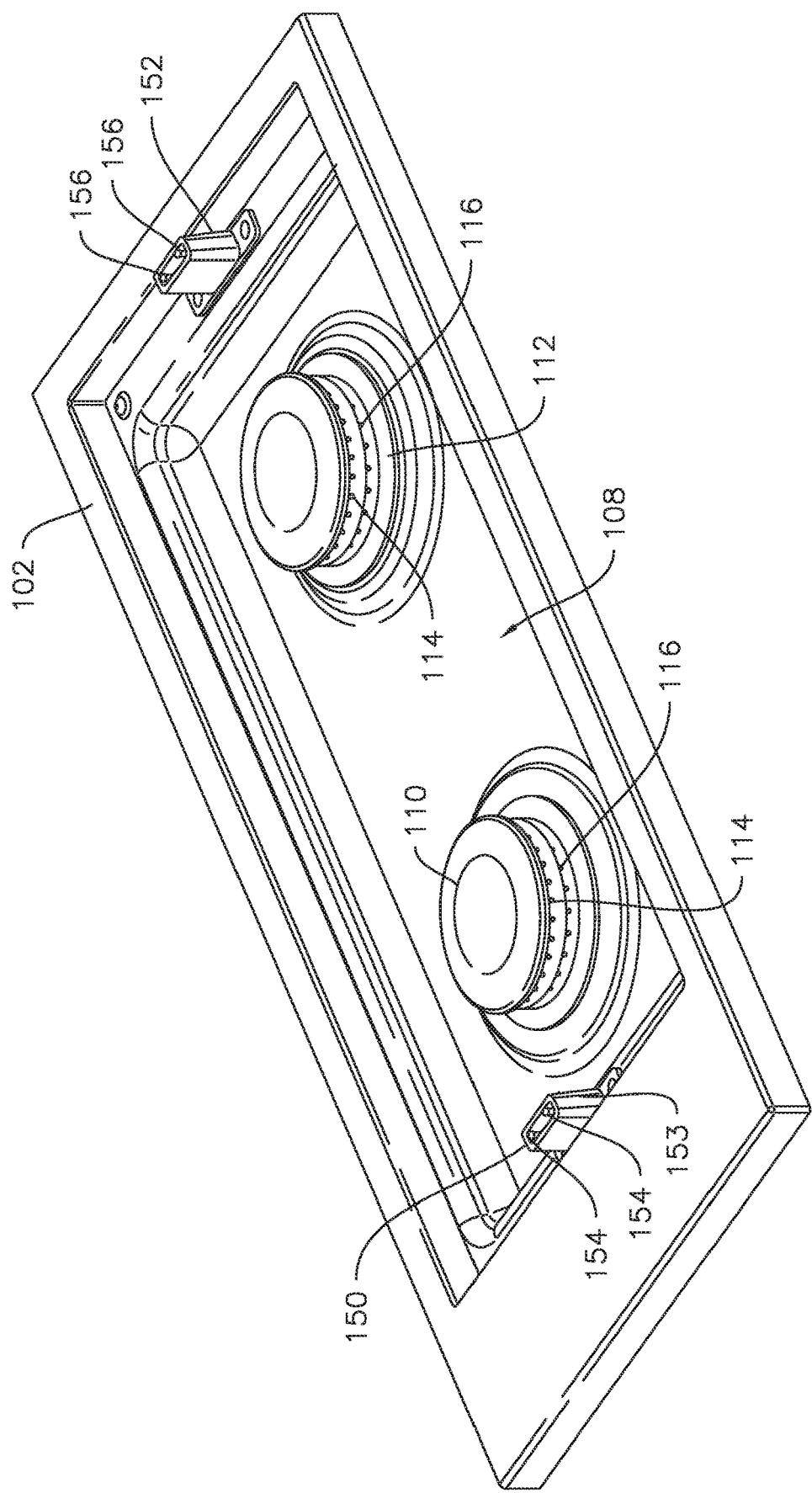
FIG. 6 provides a perspective view of a top panel with first and second burners disposed thereon, such as may be incorporated into a cooktop appliance according to one or more embodiments of the present disclosure.
Figure 7:
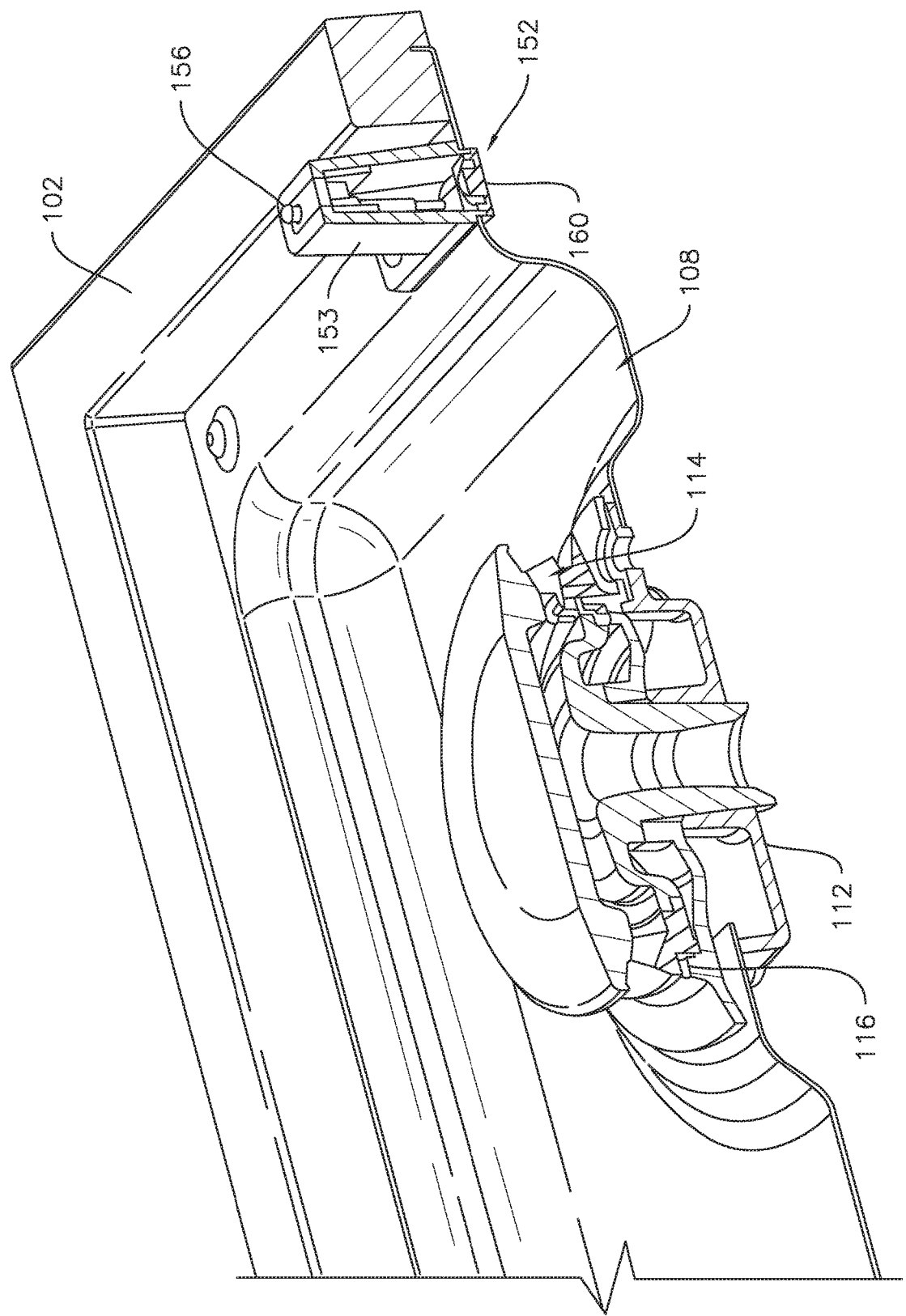
FIG. 7 provides an enlarged section view of a portion of the top panel of FIG. 6.
Figure 13:
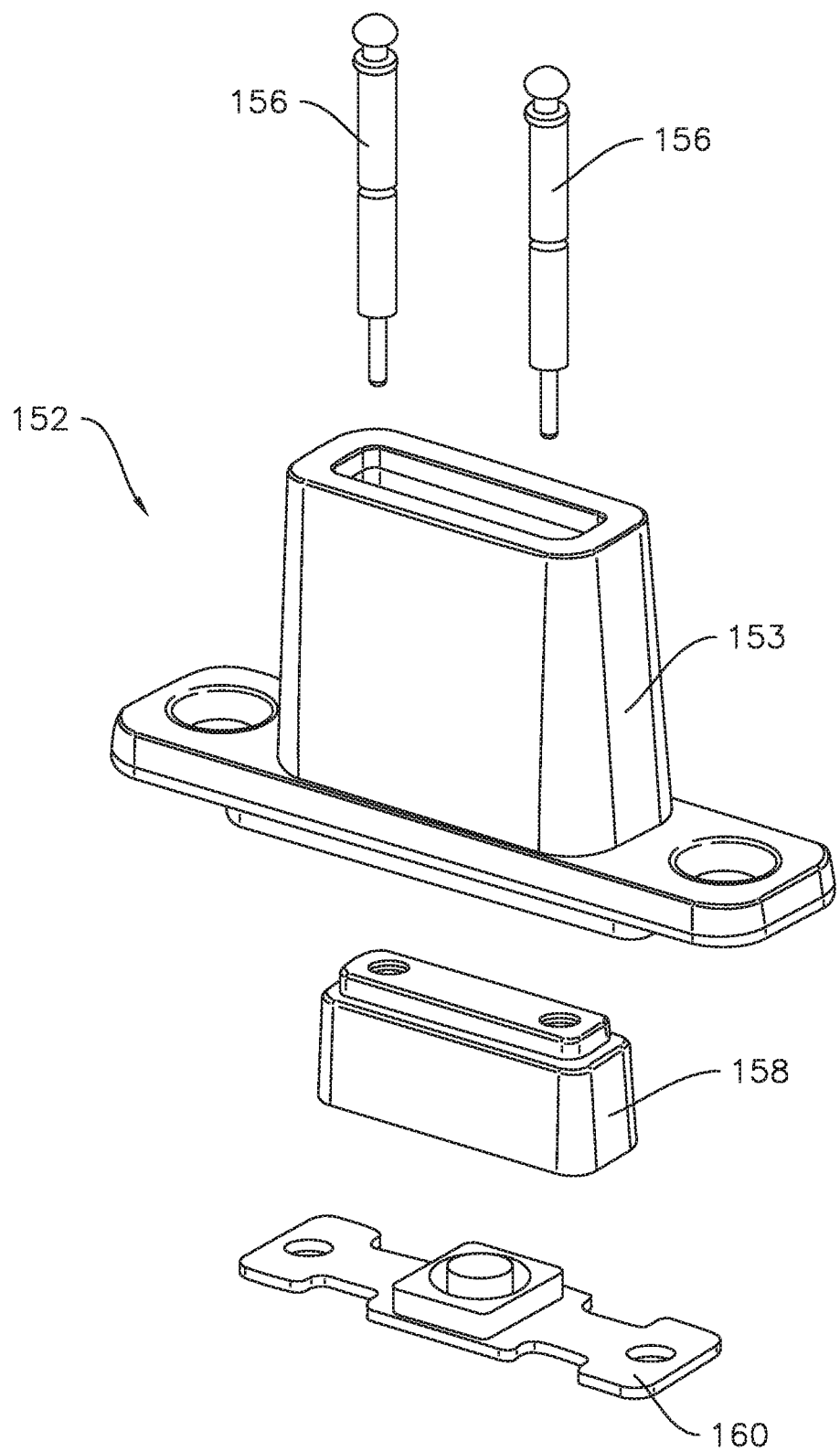
FIG. 13 provides an exploded view of a pogo pin terminal block such as may be incorporated into a cooktop appliance according to one or more embodiments of the present disclosure.
Figure 14:
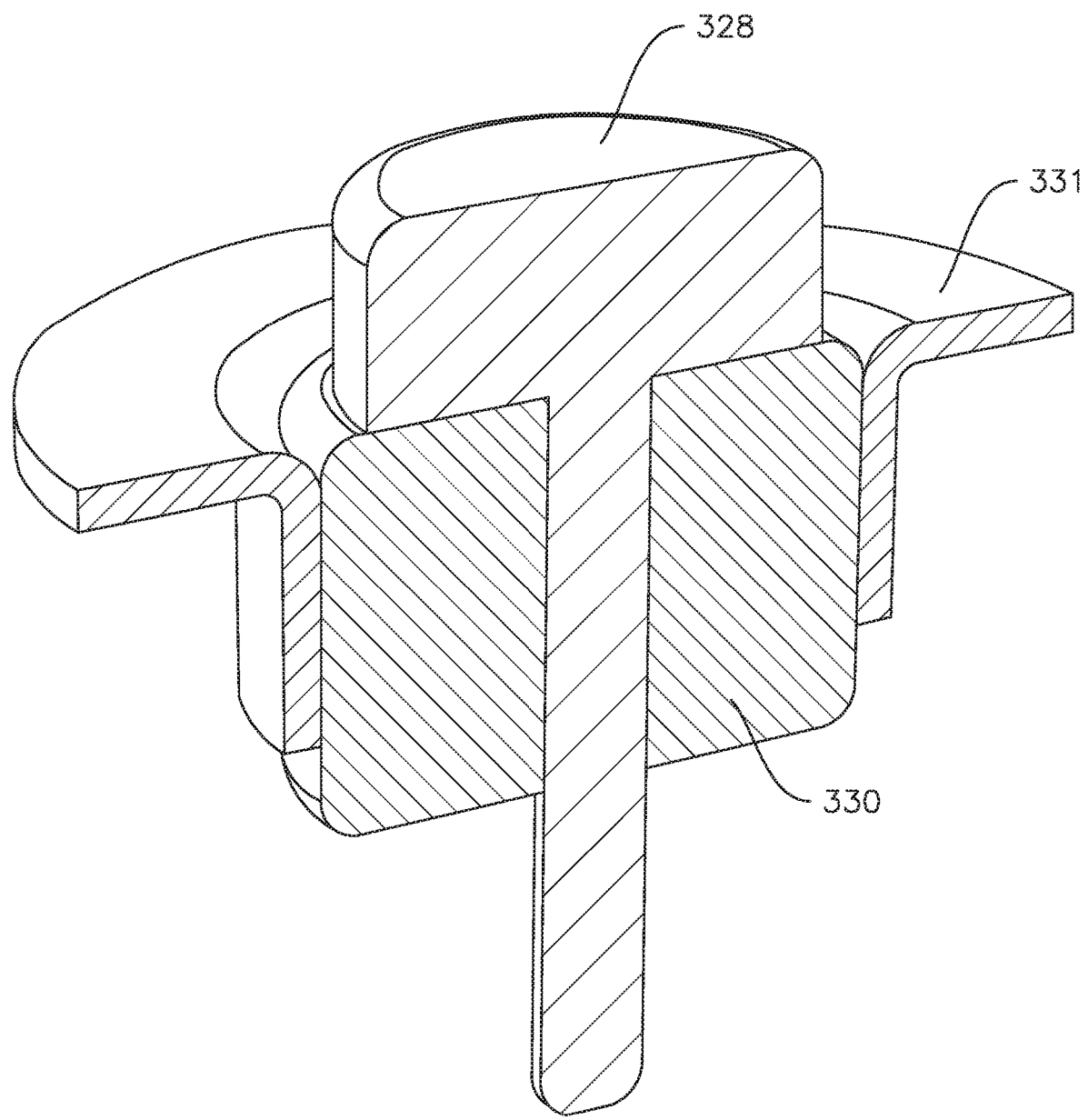
FIG. 14 provides a section view of a hermetically sealed contact pad for a temperature sensor according to one or more embodiments of the present disclosure.

As best seen in FIGS. 6, 7, and 13, the first and second connectors 154 and 156 of the first pogo pin terminal block 150 and second pogo pin terminal block 152 may be positioned in a housing 153 mounted on the panel 102, e.g., where the housing 153 is on and extending from the top surface 104 of the panel 102, such that the housing 153 elevates the respective connectors 154, 156 of each pogo pin terminal block 150 or 152 above the top surface 104 of the panel 102. Also as illustrated in FIG. 13, each pogo pin terminal block 150, 152 may include a connector block 158 and a baseplate 160. Only the second pogo pin terminal block 152 is illustrated in FIG. 13, although it should be understood that the first and second pogo pin terminal blocks 150 and 152 are substantially identical, e.g., apart from their respective locations.

In some embodiments, the first pogo pin terminal block 150 may be positioned on the panel 102 adjacent to the first burner 110 and the second pogo pin terminal block 152 may be positioned on the panel 102 adjacent to the second burner 112. For example, the first pogo pin terminal block 150 may be positioned opposite the second burner 112, e.g., about the first burner 110, along the lateral direction L, and the second pogo pin terminal block 152 may be positioned opposite the first burner 110, e.g., about the second burner 112, along the lateral direction L. As mentioned above, the first burner 110 and the second burner 112 may be aligned with each other along the transverse direction T. In such embodiments, the first pogo pin terminal block 150 may be aligned with the first burner 110 along the transverse direction T and the second pogo pin terminal block 152 may be aligned with the second burner 112 along the transverse direction T. Thus, in some embodiments, the first burner 110 and the second burner 112 may be aligned with each other and with the first pogo pin terminal block 150 and the second pogo pin terminal block 152 along the transverse direction T.

The first pogo pin terminal block 150 and the second pogo pin terminal block 152 may each include at least two connectors, such as at least two spring loaded pins or at least two contact pads. For example, the first pogo pin terminal block 150 may include first connectors 154, e.g., two spring-loaded pins 154 in the illustrated example embodiment, and the second pogo pin terminal block 152 may include second connectors 156, e.g., a second pair of spring-loaded pins 156, where the illustrated spring-loaded pins are an example embodiment of first and second connectors 154 and 156 of the first and second pogo pin terminal blocks 150 and 152. In some embodiments, the first connectors 154 and the second connectors 156 may be positioned above the first burner 110 and the second burner 112 along the vertical direction V. In some embodiments, the first connectors 154 and the second connectors 156 may be positioned outside of, e.g., above along the vertical direction V, the recessed portion 108 of the panel 102. Thus, the connectors 154 and 156 may be protected from spillage, e.g., by positioning the connectors 154 and 156 above the recessed portion 108 of the panel 102 and/or by enclosing the connectors 154 and 156, where example embodiments of enclosing the connectors 154 and 156 will be described below.

The cooktop appliance 100 may also include a frame 200 which may be mounted, such as removably mounted, to the top surface 104 of the panel 102. The frame 200 may be configured to selectively support a griddle plate 300 (FIGS. 1 through 5) over the first burner 110 and the second burner 112.

The frame 200 may thusly be positioned above the first burner 110 and the second burner 112, e.g., along the vertical direction V. For instance, in some embodiments, the frame 200 may span the two burners 110 and 112, e.g., the frame 200 may consist of a single piece spanning unsupported across the first burner 110 and the second burner 112.

The frame 200 may include a first sleeve 222 which encloses the first connectors 154 of the first pogo pin terminal block 150 on four sides when the frame 200 is mounted to the top surface 104 of the panel 102 and a second sleeve 224 which encloses the second connectors 156 of the second pogo pin terminal block 152 on four sides when the frame 200 is mounted to the top surface 104 of the panel 102.

For example, the frame 200 may include or consist of four corners, and may have a leg extending generally along the vertical direction V at each corner. The sleeves 222 and 224 of the frame 200 may be positioned between the corners, e.g., between the legs. The legs of the frame 200 may be positioned on panel 102, e.g., may extend from an outer rail 202 of the frame 200 to the top surface 104 of panel 102 when the frame 200 is mounted on the panel 102. In some embodiments, the frame 200 may include a first leg 226 and a second 228 leg positioned opposite the first leg 226 along the transverse direction T. For example, the first leg 226 and the second leg 228 may be aligned with the first sleeve 222 along the transverse direction T with the first sleeve 222 positioned between the first leg 226 and the second leg 228. In some embodiments, the frame 200 may further include a third leg 230 and a fourth leg 232 positioned opposite the third leg 230 along the transverse direction T. For example, the third leg 230 and the fourth leg 232 may be aligned with the second sleeve 224 along the transverse direction T with the second sleeve 224 positioned between the third leg 230 and the fourth leg 232.

The first leg 226 and the second leg 228 may be disposed on the frame 200 opposite the third leg 230 and fourth leg 232 along the lateral direction L. In some embodiments, the frame 200 may span unsupported across the first burner 110 and the second burner 112, e.g., without any legs or other portions of the frame 200 resting on the panel 102 between the legs 226, 228, 230, and 232, and/or between the burners 110 and 112, along the lateral direction L. The first burner 110 and the second burner 112 may be positioned between the first leg 226 and the third leg 230 along the lateral direction L when the frame 200 is mounted to the top surface 104 of the panel 102. For example, the burners 110 and 112 may be between the first pair of legs, e.g., the first and second legs 226 and 228, and the second pair of legs, e.g., the third and fourth legs 230 and 232, along the lateral direction L.

As mentioned, the frame 200 may include an outer rail 202. The outer rail 202 of the frame may extend around a perimeter of the frame, such as completely around the entire perimeter of the frame 200 and may define a peripheral support surface 204, e.g., for at least partially supporting the griddle 300 thereon. For example, the peripheral support surface 204 may be configured to selectively support a griddle plate 300 on the entire peripheral support surface 204.

In some embodiments, the outer rail 202 of the frame 200 comprises a front portion 206, a left side portion 208, a back portion 210 parallel to the front portion 206, and a right side portion 212 parallel to the left side portion 208. The front portion 206 and the back portion 210 may be spaced apart by the left side portion 208 and the right side portion 212, e.g., the back portion 210 may be positioned at an opposite end of each of the left side portion 208 and the right side portion 212 from the front portion 206. The left side portion 208 and the right side portion 212 may each extend perpendicular to the front portion 206 and the back portion 210. For example, the left side portion 208 may extend from a left end 234 of the front portion 206 at a front end 236 of the left side portion 208 to a back end 238 of the left side portion 209. The back portion 210 may extend from the back end 238 of the left side portion 208 at a left end 240 of the back portion 210 to a back end 242 of the right side portion 212 at a right end 244 of the back portion 210. The right side portion 212 may extend from the back end 242 of the right side portion 212 to a front end 246 of the right side portion 212 at a right end 248 of the front portion 206.

The frame 200 may also include a crossbar 218 extending through the frame 200 at about the middle of the frame 200. For example, the crossbar 218 may extend from a midpoint 220 of the front portion 206 to a midpoint 219 of the back portion 210. In some embodiments, the peripheral support surface 204 may be defined along the front portion 206, the left side portion 208, the back portion 210, and the right side portion 212, and the crossbar 218 may define an intermediate support surface 221. The intermediate support surface 221 may be configured to support a middle section of the griddle plate 300.

The frame 200 may be formed of cast metal, such as cast iron or aluminum, such that the outer rail 202, cross-bar 218, legs 226, 228, 230, and 232, and sleeves 222 and 224 are formed from a single, seamless piece of metal. Frame 200 may be removable from panel 102, e.g., by lifting upwardly on the frame 200.

Moreover, it is understood that further additional or alternative embodiments of the frame 200 may be placed over a single burner assembly, e.g., to permit a griddle plate positioned on the frame 200 to receive heat output from only the single burner assembly, or the frame 200 may be placed over more than two burner assemblies, e.g., to permit a griddle plate positioned on the frame 200 to receive heat output from three or more burner assemblies.

As generally indicated across FIGS. 1 through 5, the frame 200 may be configured to selectively receive a griddle plate 300 (e.g., in a mounted position). For instance, the griddle plate 300 may be selectively disposed on frame 200 to receive heat from two or more discrete gas burner assemblies, e.g., the first and second burners 110 and 112.

As shown in FIGS. 1 through 5 the griddle plate 300 may be disposed on the frame 200 over top panel 102 (e.g., along the vertical direction V) in a mounted position. Griddle plate 300 defines a top cooking surface 302 and a bottom heating surface 304 below and beneath top cooking surface 302. For example, as illustrated, the top cooking surface 302 and the bottom heating surface 304 may be spaced apart along the vertical direction V and may be oppositely oriented along the vertical direction V. In example embodiments, griddle plate 30 is a generally planar member. In turn, top cooking surface 302 may be a substantially flat surface. Moreover, one or both of top cooking surface 302 and bottom heating surface 304 may extend perpendicular to the vertical direction V, e.g., in a lateral-transverse plane defined by the lateral direction L and the transverse direction T. Griddle plate 300 may have any suitable shape. For example, griddle plate 300 may be substantially rectangular, e.g., in a plane that is perpendicular to the vertical direction V.

As shown in FIGS. 1 through 4, the griddle plate 300 may be selectively disposed over (e.g., directly above) a corresponding spaced-apart pair of burners, e.g., first gas burner 110 and second gas burner 112. During use, top cooking surface 302 faces away from panel 102 to receive a cooking item (e.g., food) thereon. By contrast, bottom heating surface 304 may be opposite from top cooking surface 302 and faces panel 102 during use. Thus, bottom heating surface 304 may face panel 102 to receive a thermal output (e.g., flame or heated air) from the corresponding burners 110, 112. The bottom surface 304 of the griddle plate 300 may be supported on the frame 200 when the griddle plate 300 is mounted on the frame 200. For example, the bottom surface 304 of the griddle plate 300 may be in contact with the frame 200, such as with the peripheral support surface 204 and the intermediate support surface 221 thereof.

In some embodiments, the griddle plate 300 may include at least one embedded temperature sensor, e.g., a first embedded temperature sensor 310 and a second embedded temperature sensor 312, as illustrated. In other embodiments, such as but not limited to when the griddle plate 300 is mounted over a single burner only, the griddle plate 300 may include a single embedded temperature sensor which extends to at or about a geometric center of the griddle plate 300, such as the center of the cooking surface 302 in the lateral-transverse plane. As will be described in more detail below, the embedded temperature sensor(s) may be hermetically sealed. In some embodiments, when the griddle plate is mounted on the frame 200, the first embedded temperature sensor 310 may be positioned above the first burner 110 and the second embedded temperature sensor 312 may be positioned above the second burner 112. For example, the first embedded temperature sensor 310 may be positioned directly above the first burner 110 along the vertical direction V and the second embedded temperature sensor 312 may be positioned directly above the second burner 112 along the vertical direction V. The first embedded sensor 310 and the second embedded sensor 312 may be positioned between the bottom surface 304 and the top surface 302 of the griddle plate 300. The embedded sensors 310 and 312 may be spaced apart from each of the bottom surface 304 and the top surface 302 of the griddle plate 300.

Figure 9:
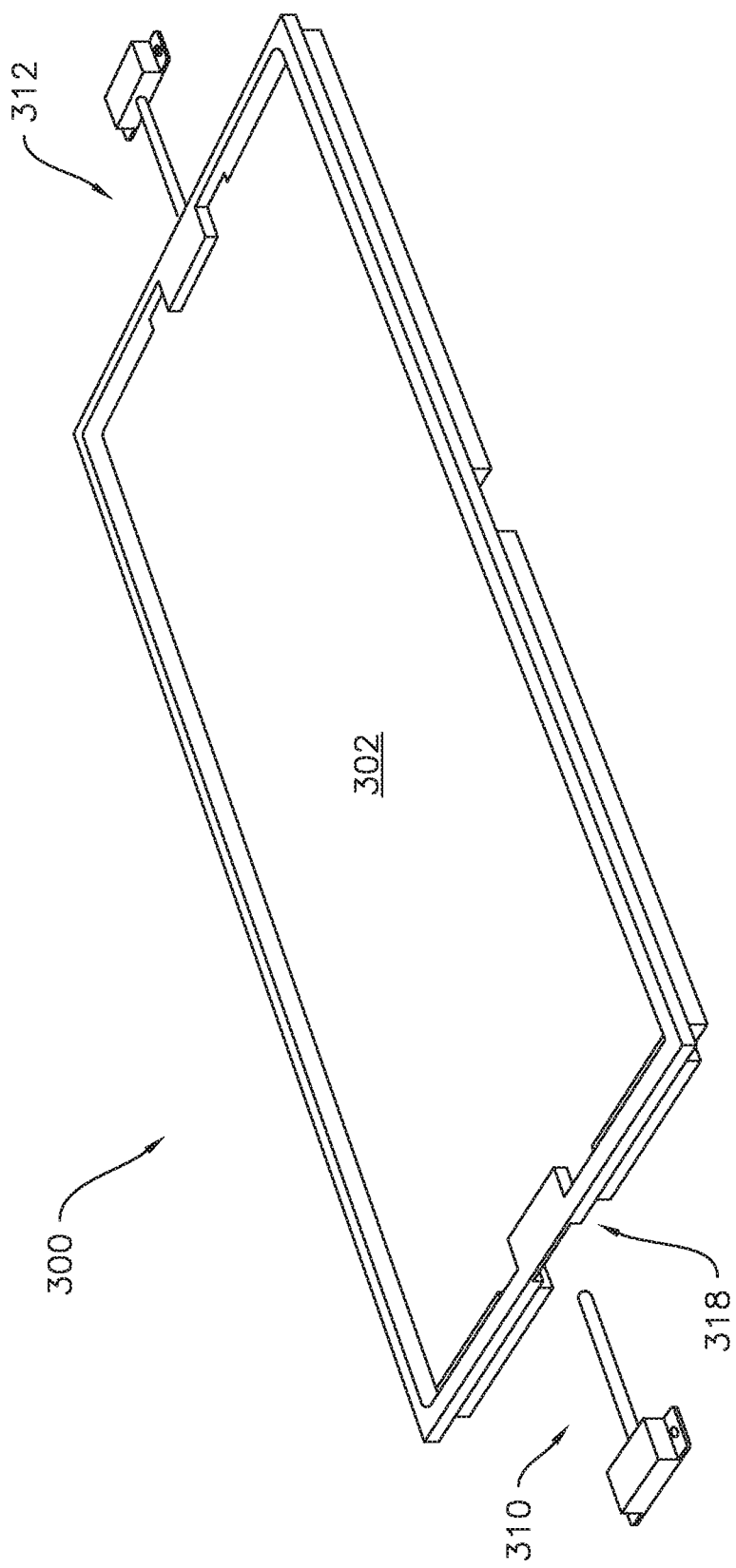
FIG. 9 provides a top perspective view of a griddle plate and a temperature sensor therefor such as may be incorporated into a cooktop appliance according to one or more embodiments of the present disclosure.
Figure 10:
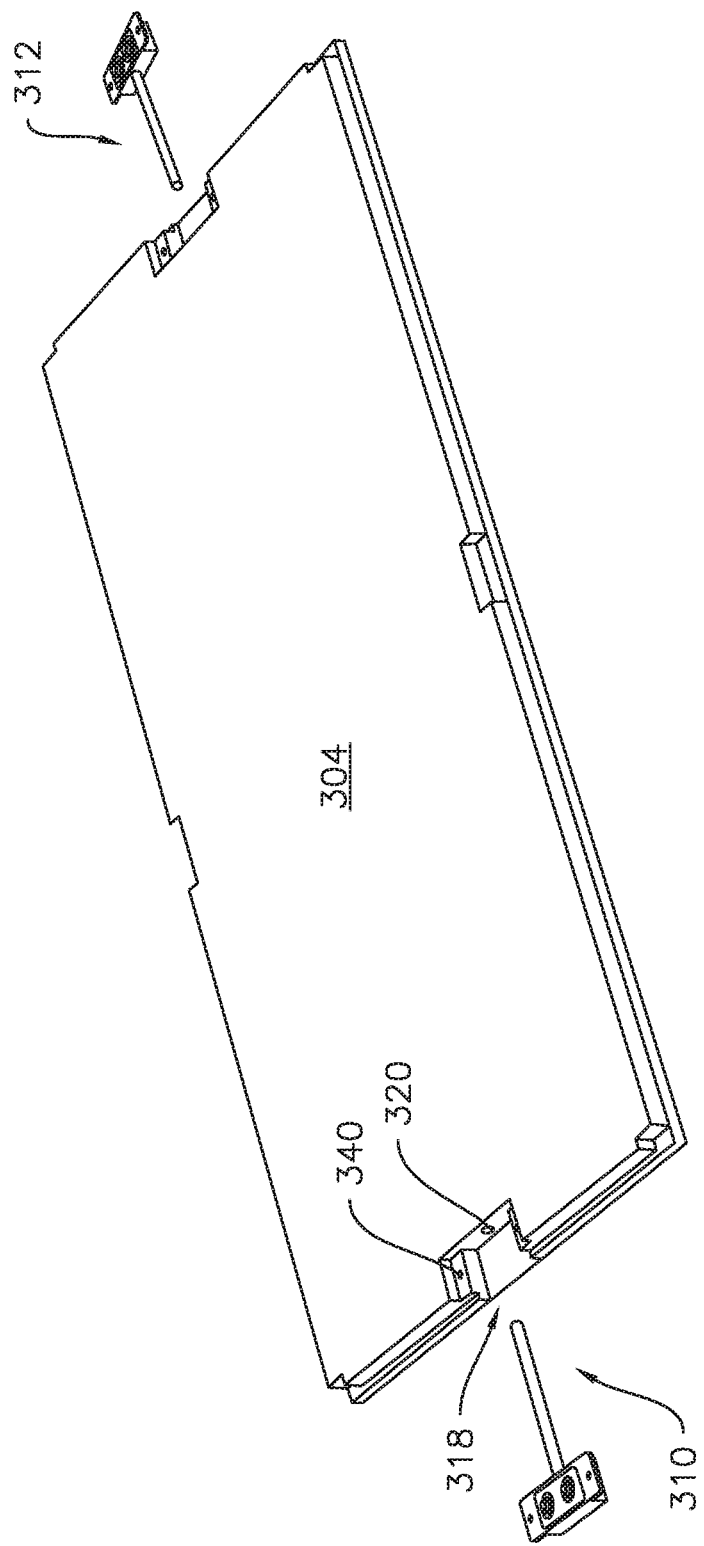
FIG. 10 provides a bottom perspective view of a griddle plate and a temperature sensor therefor such as may be incorporated into a cooktop appliance according to one or more embodiments of the present disclosure.
Figure 12:
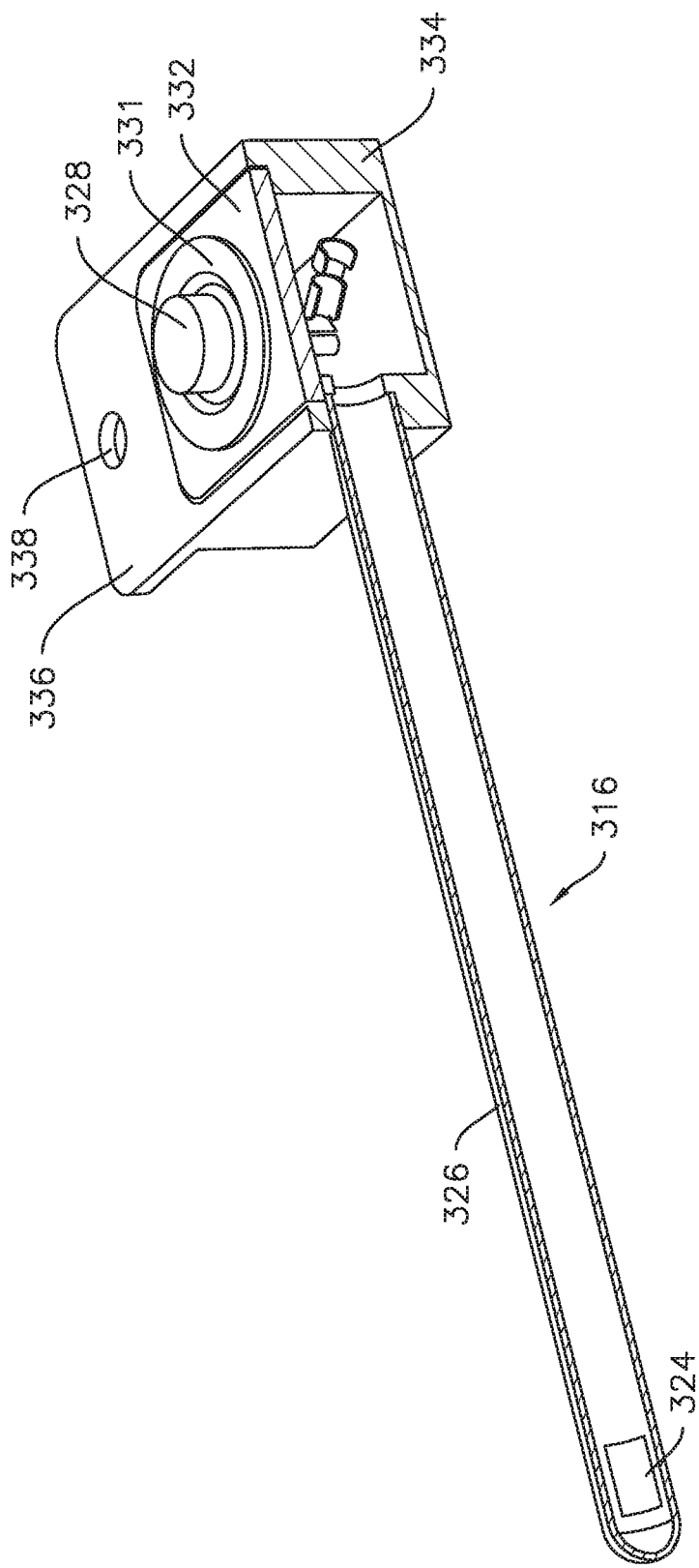
FIG. 12 provides a section view of the temperature sensor of FIG. 11.

FIGS. 9 and 10 provide exploded perspective views of the griddle plate 300 with the first embedded temperature sensor 310 and the second embedded temperature sensor 312 removed from the griddle plate 300. In some embodiments, the first embedded temperature sensor 310 and the second embedded temperature sensor 312 may each include a base 314 and a probe 316. The probe 316 may be or include any suitable temperature sensor, such as a thermistor or a thermocouple, among other possible examples. For example, as illustrated in FIG. 12, the sensor 324 may be disposed within a sheath 326 of the probe 316, and the sheath 326 may be attached to the base 314.

Still referring to FIGS. 9 and 10, the griddle plate 300 may include a recess 318 which receives the base 314 of the first embedded temperature sensor 310 and a bore hole 320 extending partially into the griddle plate 300, e.g., along the lateral direction L, between the top surface 302 and the bottom surface 304 which receives the probe 316 of the first embedded temperature sensor 310. The base 314 of the each embedded temperature sensor 310, 312 may include connectors, such as pogo pin connectors, e.g., contact pads. For example, the base 314 may include two contact pads 322 for connecting with spring-loaded pins 154 of the first pogo pin terminal block 150 or the spring-loaded pins 156 of the second pogo pin terminal block 152 when the griddle plate 300 is mounted on the frame 200 and the frame 200 is mounted on the panel 102.

As mentioned above, the cooktop appliance 100 may include a controller 130 and the griddle plate 300 may include first and second embedded temperature sensors, e.g., thermistors, 310 and 312. The first and second embedded temperature sensors 310 and 312 of the griddle plate 300 may be selectively in operative communication with the controller 130, e.g., may be in operative communication with the controller 130 via a connection between the first and second pogo pin terminal blocks 150 and 152 on the panel 102 and respective pogo pin connectors on each temperature sensor 310 and 312 when the griddle plate 300 is mounted on the frame 200 while the frame 200 is mounted on the panel 102.

For example, the controller 130 may operable in a griddle mode and/or configured to operate in a griddle mode. The griddle mode may comprise coordinating operation of the first and second burners 110 and 112 to provide consistent or uniform heating across the griddle plate, e.g., when the griddle plate 300 is mounted on the frame 200 and the frame 200 is mounted on the panel 102 such that the first and second embedded temperature sensors 310 and 312 are in communication with the controller 130 via the pogo pin connections described above.

Figure 8:
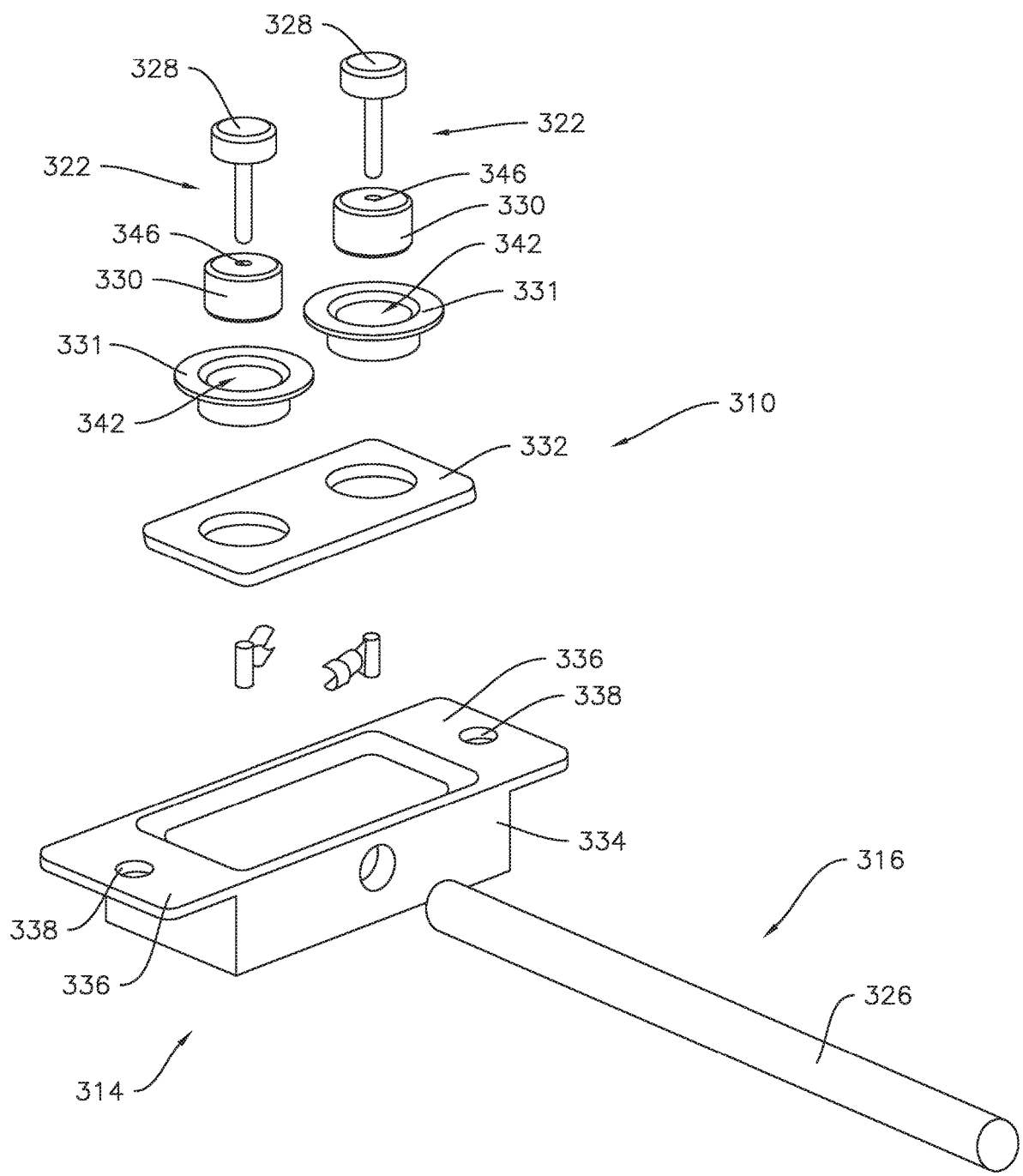
FIG. 8 provides an exploded view of a temperature sensor such as may be incorporated into a cooktop appliance according to one or more embodiments of the present disclosure.
Figure 11:
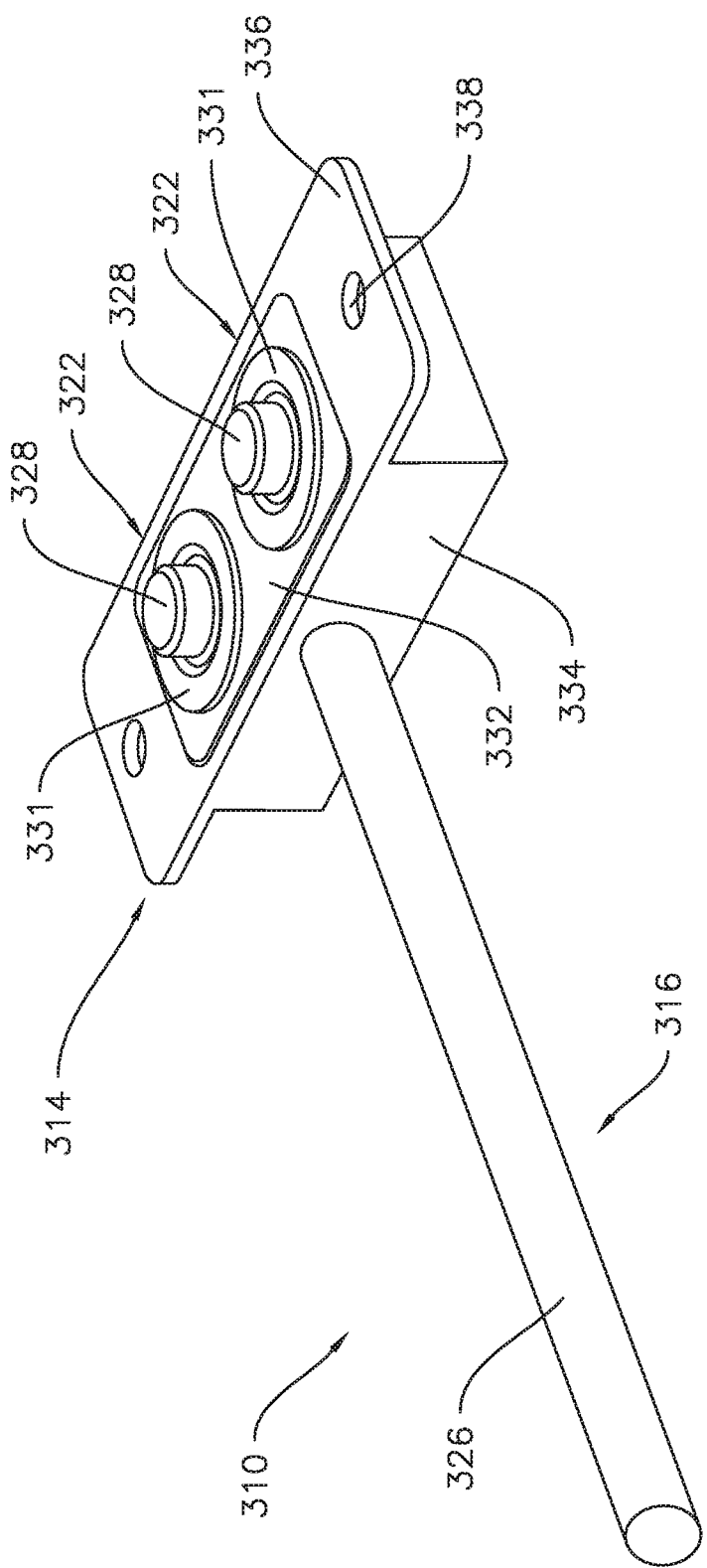
FIG. 11 provides a perspective view of a temperature sensor such as may be incorporated into a cooktop appliance according to one or more embodiments of the present disclosure.
Figure 15:
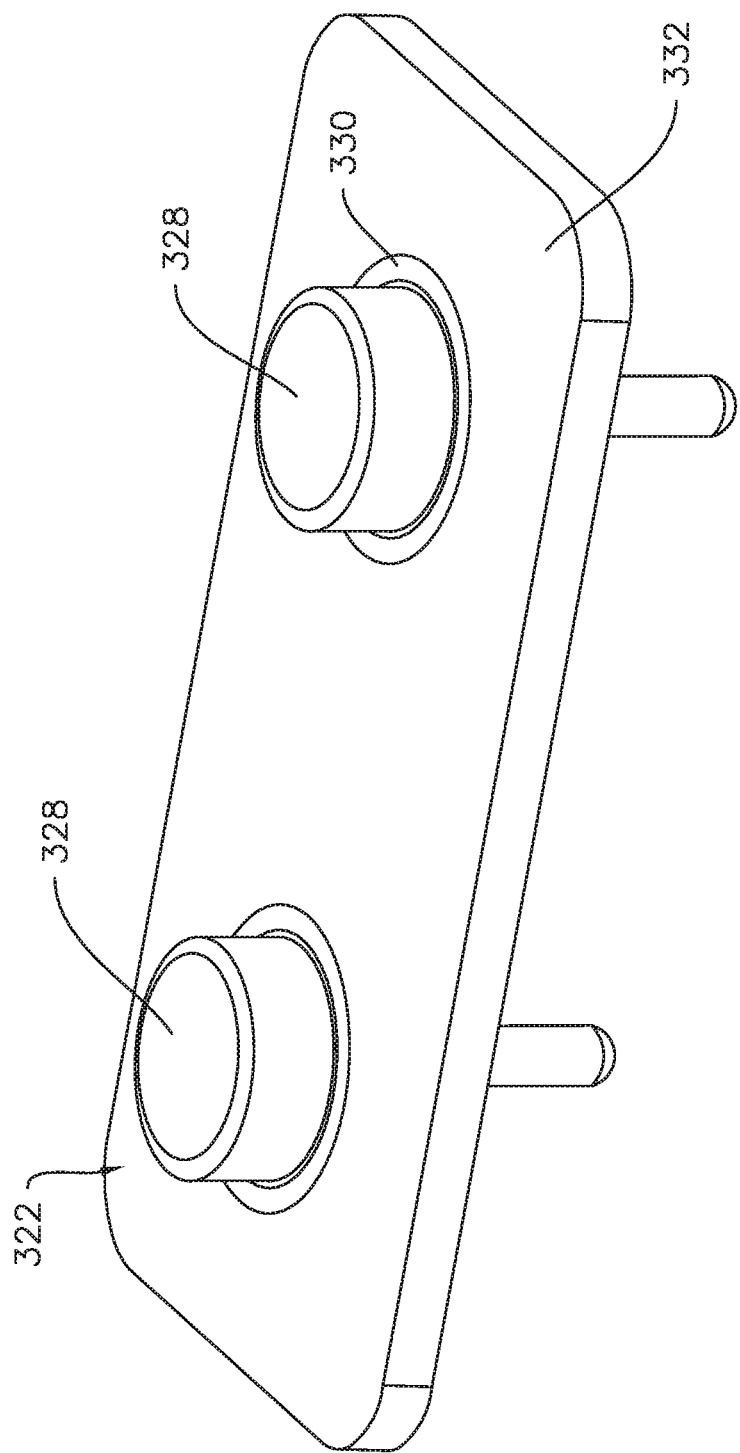
FIG. 15 provides a perspective view of a pair of hermetically sealed contact pads for a temperature sensor according to one or more additional embodiments of the present disclosure.
Figure 16:
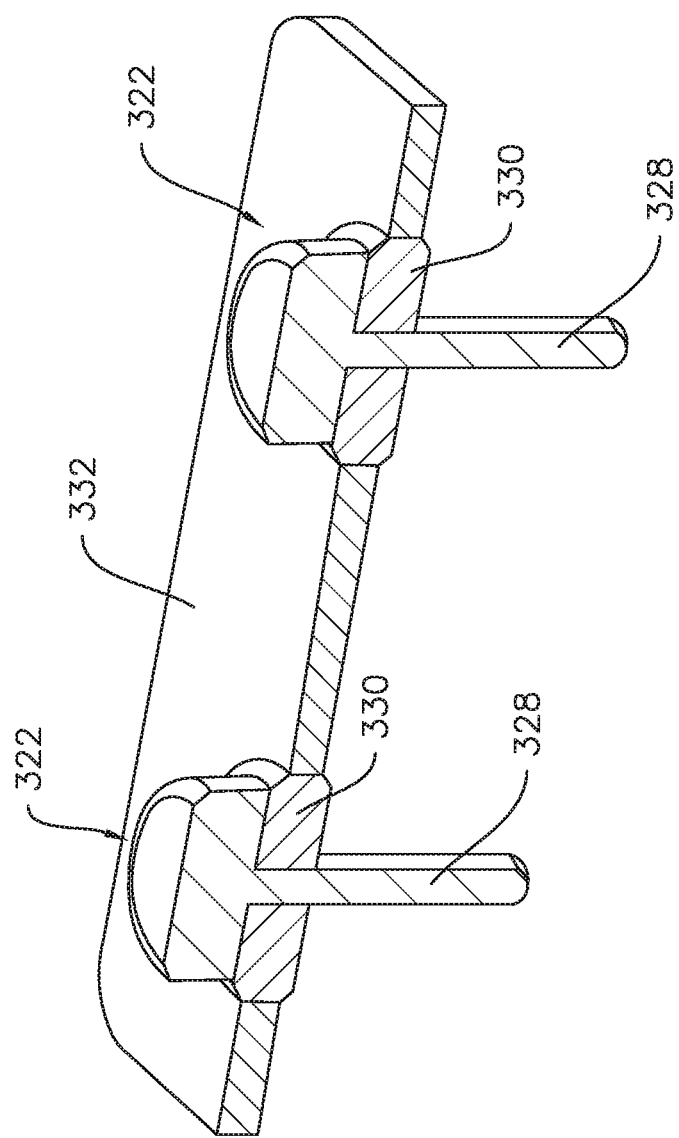
FIG. 16 provides a section view of the pair of hermetically sealed contact pads of FIG. 15.
Figure 17:
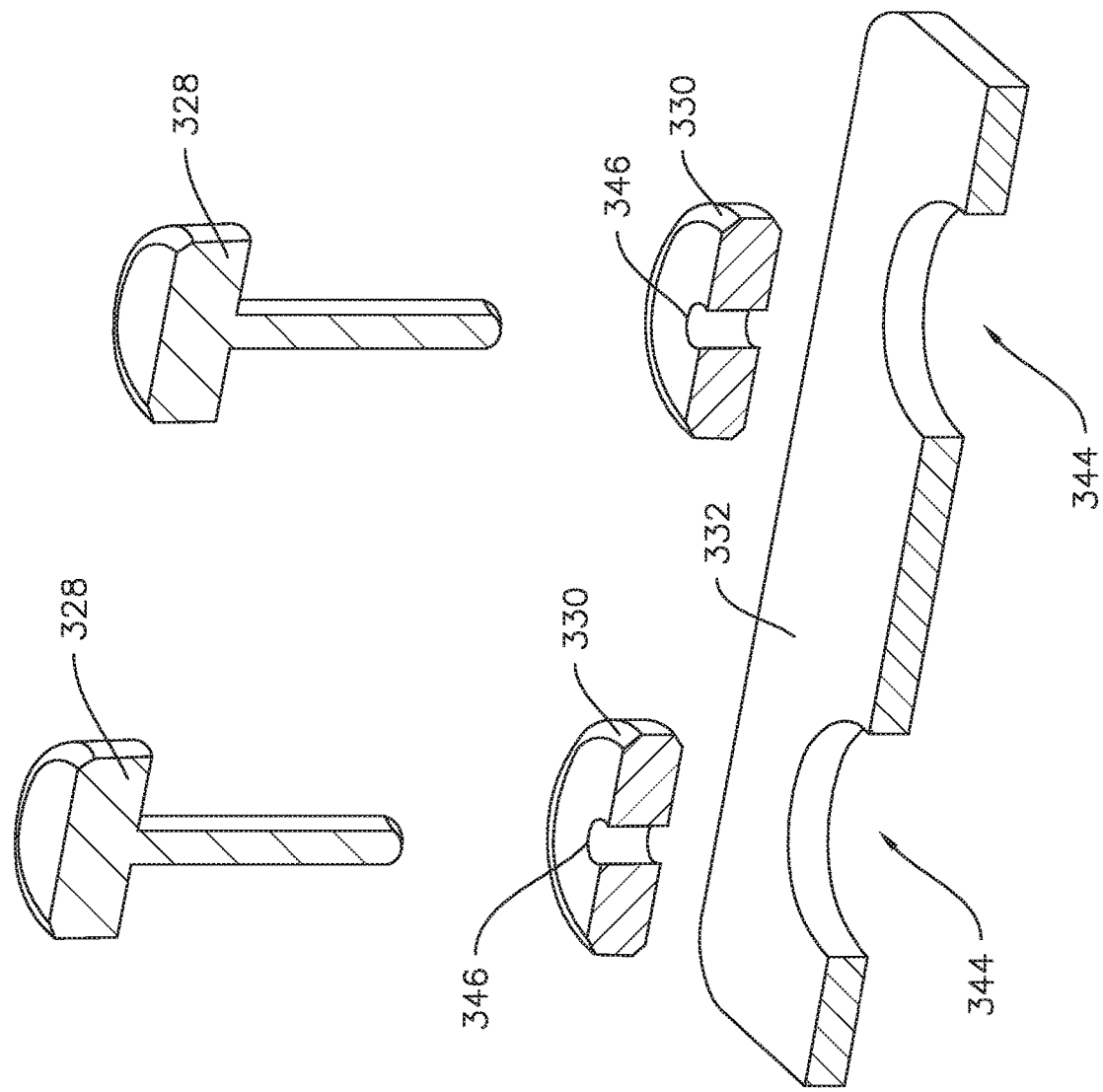
FIG. 17 provides an exploded section view of the pair of hermetically sealed contact pads of FIG. 15.

FIGS. 8 and 11 illustrate an exemplary hermetically sealed temperature sensor 310 (first temperature sensor 310 is illustrated by way of example, it should be understood that the second temperature sensor 312, when provided, will have substantially the same features except for the location and position relative to the griddle plate 300). As shown, the base 314 of the temperature sensor 310 may include a housing 334 and a cover plate 332. The contact pads 322 each include an electrical contact 328, and each electrical contact 328 is received in a corresponding insert 330, as will be described in more detail below. In some embodiments, the temperature sensor 310 may include a bushing 331 mated with each insert 330, e.g., as illustrated in FIGS. 8, 11, 12, and 14. In additional embodiments, e.g., as illustrated in FIGS. 15-17, the bushings 331 may be omitted and the inserts 330 may be in direct contact with the cover plate 332. As noted in FIG. 8, the base 314, e.g., the housing 334 thereof, may include a pair of opposing flanges 336 each with an aperture 338 extending therethrough. The temperature sensor 310 may be mounted to the griddle plate 300, e.g., within the recess 318 thereof, and fixed in place via fasteners, e.g., screws, passing through each aperture 338 and into recesses 340 (FIG. 10) in the griddle plate 300.

A hermetic seal may be formed in the base 314 of the temperature sensor 310. For example, in some embodiments, the hermetic seal in the base 314 (which may also be considered as hermetic sealing of the base 314) may be or include a hermetic seal between the housing 334 and the cover plate 332, such as by welding, e.g., laser welding, the cover plate 332 to the housing 334. Any suitable welding technique may be used which results in a weld seam that is continuous around the interface or joint between the cover plate 332 and the housing 334 such that the weld seam provides a hermetic seal between the cover plate 332 and the housing 334. The hermetic seal may also include a hermetic seal between the base 314 and the probe 316, for example, the sheath 326 of the probe 316 may be welded (e.g., in the same or similar manner as described above with respect to the cover plate 332 and housing 334) or press fit into the housing 334 of the base 314 to form a hermetic seal between the sheath 326 and the housing 332, e.g., to hermetically seal the probe 316 to the base 314.

In some embodiments, the hermetic seal formed in the base 314 may be or include a seal between each electrical contact 328 of each contact pad 322 and the corresponding insert 330. Additionally, each insert 330 may be hermetically sealed to or with a corresponding bushing 331 (e.g., as in FIGS. 11, 12, and 14) or directly to the cover plate 332 (e.g., as in FIGS. 15 and 16). In embodiments where the bushings 331 are provided, each bushing 331 may be received in and directly sealed to the cover plate 332, such as each bushing 331 may be welded to the cover plate 332, e.g., in the same or similar manner as described above with respect to the cover plate 332 and housing 334.

The inserts 330 may be formed of a glass or ceramic material. The electrical contacts 328 may be formed of a metal material. Additionally, the base 314 may include one or more metal portions, e.g., the housing 334 and the cover plate 332 may be formed of metal. Thus, in various embodiments, the hermetic seal formed in the base 314 may be or include a glass-to-metal seal between the electrical contacts 328 and the inserts 330, and between the inserts 330 and the bushings 331 or cover plate 332, or may be or include a ceramic-to-metal seal between the electrical contacts 328 and the inserts 330, and between the inserts 330 and the bushings 331 or cover plate 332. Such glass-to-metal seals or ceramic-to-metal seals may be formed by assembling the contact 328 within the glass or ceramic insert 330 and the insert 330 within the bushing 331 or cover plate 332 and fusing the assembled components in a furnace to create a gas-tight sealed contact pad 322. When the bushing 331 is not included, both contact pads 322 may be assembled in the cover plate 332 and all five components (two contacts 328, two inserts 330, and one cover plate 332) may be fused together in a single firing in the furnace. The temperature in the furnace may be sufficiently high to cause the components to fuse together and fill in any gaps therebetween, resulting in a hermetically sealed contact assembly. The materials selected, e.g., whether the inserts 330 are glass or ceramic, may be based on compatibility for forming such seals with the metal material of the electrical contacts 328, e.g., based on the coefficients of thermal expansion of each material. For example, the electrical contacts 328 may each include a protruding portion which extends within and through a center bore 346 in the respective insert 330 and each insert 330 may be positioned within a through hole 342 in the respective bushing 331 (FIG. 8) or a through hole 344 in the cover plate 332 (FIG. 17).

In some embodiments, the coefficients of thermal expansion may be matched, such that when the electrical contacts 328 and the inserts 330 are assembled as described above and then heated, the materials may be fused together to form a seal therebetween. In other embodiments, the coefficients of thermal expansion may be different, such that when so assembled and then heated, the metal components, e.g., the electrical contacts 328 and the bushings 331 or cover plate 332, may expand faster than the inserts 330, causing the components, i.e., the metal components and the inserts 330, to press together as the assembly is heated, thereby forming a compressive seal between the components.

The cooktop appliance 100 shown and described herein illustrates various example embodiments of the present disclosure. Thus, although described in the context of cooktop appliance 100, the present disclosure may be used in cooktop appliances having other configurations, e.g., a cooktop appliance with fewer burner assemblies or additional burner assemblies. Similarly, the present disclosure may be used in cooktop appliances that include an oven, i.e., range appliances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
   a panel comprising a top surface and a bottom surface;
   a burner disposed on the panel;
   a terminal block positioned on the panel adjacent to the burner;
   a griddle plate configured to be supported over the burner; and
   a hermetically sealed temperature sensor embedded in the griddle plate, the temperature sensor comprising a base, a probe extending from the base, a first contact pad in the base, a second contact pad in the base, and a hermetic seal formed in the base, wherein the contact pad is configured to form an electrical connection with the terminal block, wherein the hermetic seal comprises a ceramic-to-metal seal between an electrical contact of the contact pad and a ceramic insert, and a ceramic-to-metal seal between the ceramic insert and a metal portion of the base, wherein the first contact pad and the second contact pad are configured to collectively form an electrical connection with the terminal block, and wherein the hermetic seal formed in the base comprises a hermetic seal between each of the first contact pad and the second contact pad and the base.

2. The cooktop appliance of claim 1, wherein the metal portion of the base is a cover plate.

3. The cooktop appliance of claim 1, wherein the metal portion of the base is a bushing, the bushing received in and sealed to a cover plate of the base.

4. The cooktop appliance of claim 1, wherein the base comprises a housing and a cover plate, and wherein the hermetic seal further comprises a laser weld joint between the housing and the cover plate.

5. The cooktop appliance of claim 1, wherein the griddle plate extends from a bottom surface facing the burner to a top surface opposite the bottom surface, the top surface configured for receiving food items thereon, wherein the temperature sensor is positioned between the bottom surface and the top surface.

6. The cooktop appliance of claim 1, wherein the terminal block comprises a pogo pin terminal block.

7. A cooktop appliance comprising:
   a panel;
   a burner disposed on the panel;
   a griddle plate configured to be removably positioned over the burner; and
   a hermetically sealed temperature sensor embedded in the griddle plate, the temperature sensor comprising a base, a probe extending from the base, a first contact pad in the base, a second contact pad in the base, and a hermetic seal formed in the base, wherein the hermetic seal comprises a glass-to-metal seal between an electrical contact of the contact pad and a glass insert, and a glass-to-metal seal between the glass insert and a metal portion of the base, wherein the hermetic seal formed in the base comprises a hermetic seal between each of the first contact pad and the second contact pad and the base.

8. The cooktop appliance of claim 7, wherein the metal portion of the base is a cover plate.

9. The cooktop appliance of claim 7, wherein the metal portion of the base is a bushing, the bushing received in and sealed to a cover plate of the base.

10. The cooktop appliance of claim 7, wherein the base comprises a housing and a cover plate, and wherein the hermetic seal further comprises a laser weld joint between the housing and the cover plate.

11. The cooktop appliance of claim 7, wherein the griddle plate extends from a bottom surface facing the burner to a top surface opposite the bottom surface, the top surface configured for receiving food items thereon, wherein the temperature sensor is positioned between the bottom surface and the top surface.

12. The cooktop appliance of claim 7, further comprising a pogo pin terminal block positioned on the panel adjacent to the burner, wherein the contact pad is configured to form an electrical connection with the terminal block.

13. A cooktop appliance comprising:
    a panel;
    a burner disposed on the panel;
    a griddle plate configured to be removably positioned over the burner, the griddle plate extends vertically from a bottom surface facing the burner to a top surface opposite the bottom surface, the top surface configured for receiving food items thereon; and
    a hermetically sealed temperature sensor embedded in the griddle plate, the temperature sensor comprising a base, a probe extending from the base, a contact pad in the base, and a hermetic seal formed in the base, the probe of the temperature sensor positioned between the bottom surface of the griddle plate and the top surface of the griddle plate, wherein the hermetic seal comprises a direct seal between an insert and a bushing, the bushing received in and sealed to a cover plate of the base.

14. The cooktop appliance of claim 13, wherein the hermetic seal comprises a glass-to-metal seal between an electrical contact of the contact pad and a glass insert, and a glass-to-metal seal between the glass insert and a metal portion of the base.

15. The cooktop appliance of claim 13, wherein the hermetic seal comprises a ceramic-to-metal seal between an electrical contact of the contact pad and a ceramic insert, and a ceramic-to-metal seal between the ceramic insert and a metal portion of the base.

\* \* \* \* \*